United States Patent
Papamoschou

[19]

[11] Patent Number: 5,916,127
[45] Date of Patent: Jun. 29, 1999

[54] METHOD OF ELIMINATING MACH WAVES FROM SUPERSONIC JETS

[75] Inventor: Dimitri Papamoschou, Mission Viejo, Calif.

[73] Assignee: The Regents of the University of Calif., Oakland, Calif.

[21] Appl. No.: 08/688,622

[22] Filed: Jul. 30, 1996

Related U.S. Application Data

[62] Division of application No. 08/435,345, May 5, 1995, Pat. No. 5,590,520.

[51] Int. Cl.$^6$ .................................. F02K 1/40; F02K 1/44
[52] U.S. Cl. .............................................. 60/226.1; 60/263
[58] Field of Search .................................... 60/226.1, 262, 60/263; 181/213, 215, 220; 239/265.11, 265.13, 265.25

[56] References Cited

U.S. PATENT DOCUMENTS

| | | | |
|---|---|---|---|
| 2,635,420 | 4/1953 | Jonker | 60/226.1 |
| 2,672,726 | 3/1954 | Wolf et al. | 60/226.1 |
| 2,798,360 | 7/1957 | Hazen et al. | 60/226.1 |
| 4,050,242 | 9/1977 | Dusa | 60/226.1 |

*Primary Examiner*—Louis J. Casaregola
*Attorney, Agent, or Firm*—Knobbe, Martens, Olson & Bear, LLP

[57] ABSTRACT

A method and device for reducing the amount of noise generated by a supersonic jet engine is provided. The method creates an envelope of air around the supersonic jet exhaust. The temperature and velocity of this envelope is controlled to eliminate or reduce the formation of noise making Mach waves.

19 Claims, 6 Drawing Sheets

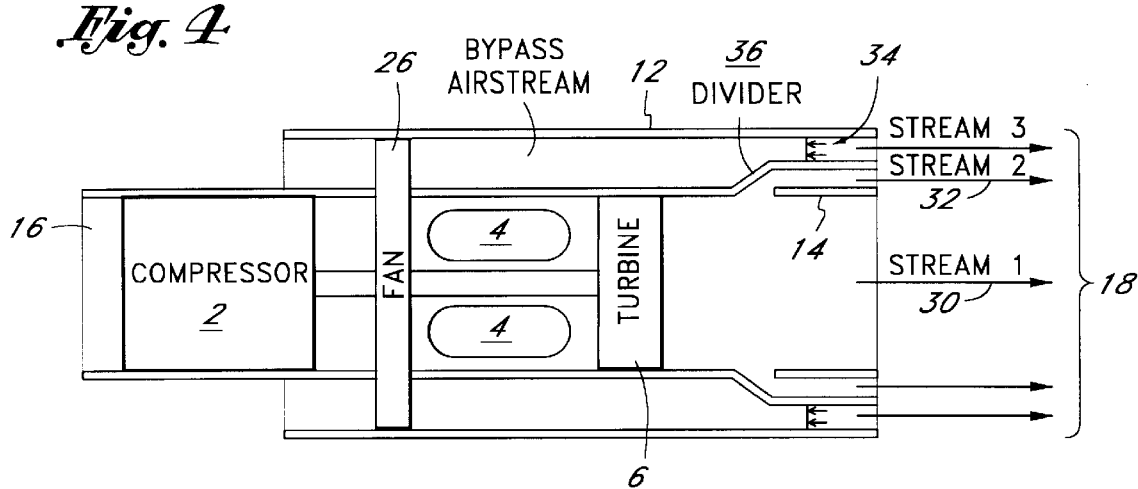
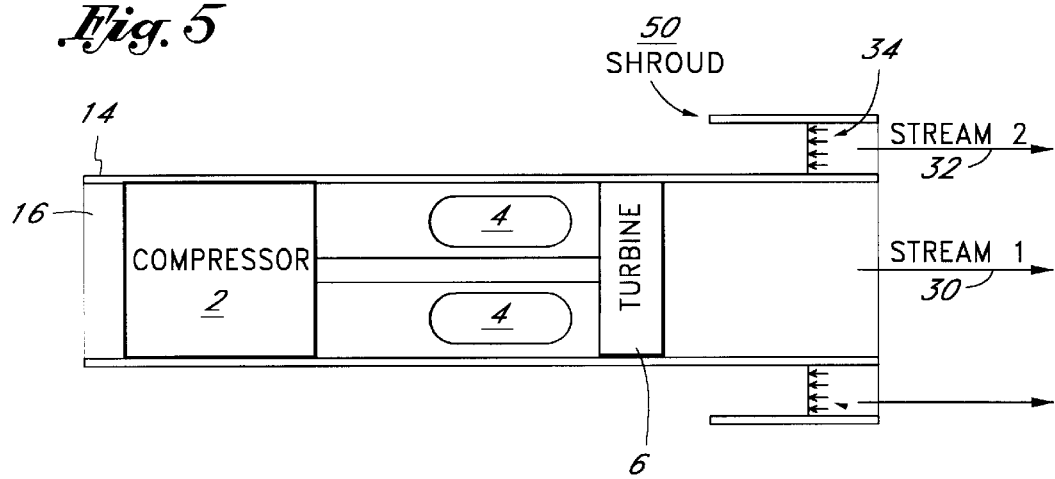
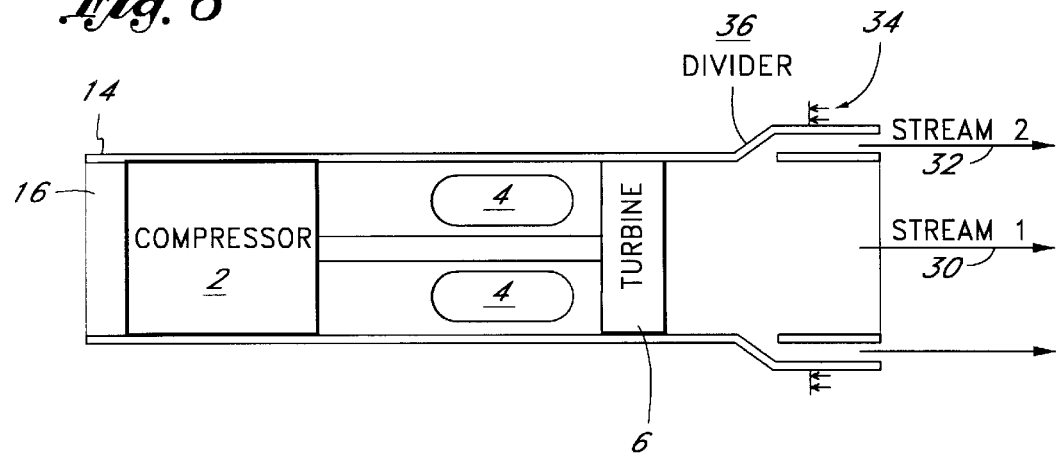

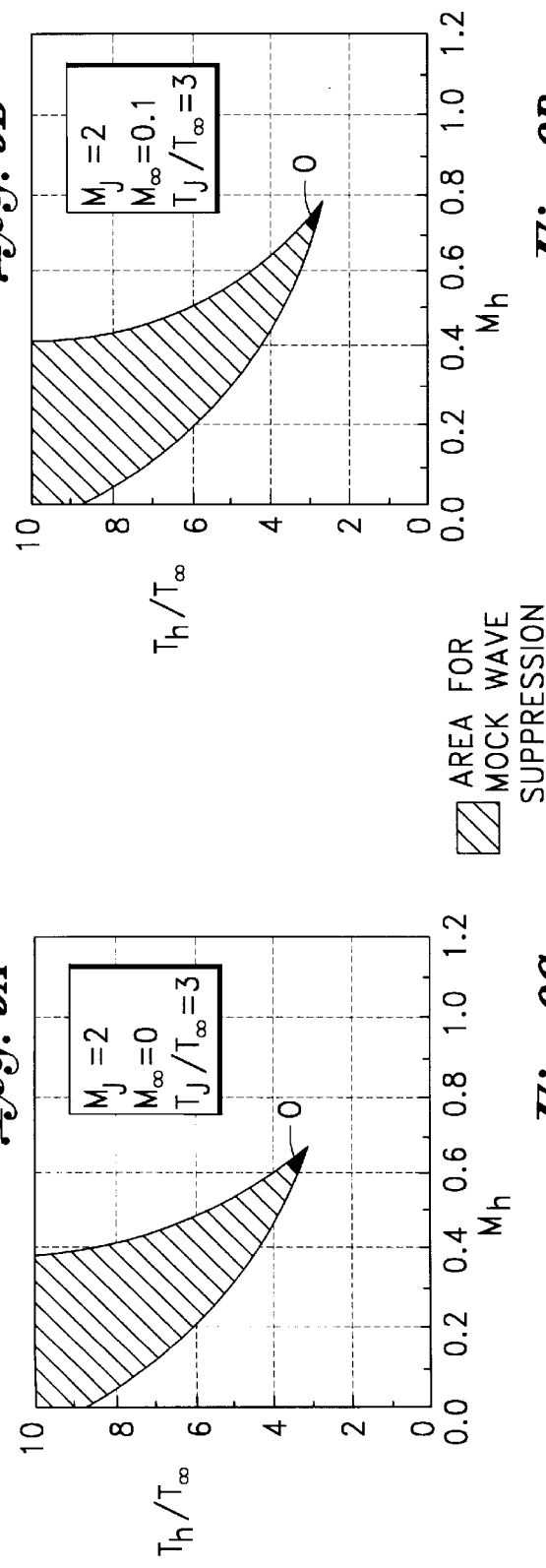
Fig. 9A  $M_J=2$, $M_\infty=0$, $T_J/T_\infty=3$
Fig. 9B  $M_J=2$, $M_\infty=0.1$, $T_J/T_\infty=3$
Fig. 9C  $M_J=2$, $M_\infty=0.2$, $T_J/T_\infty=3$
Fig. 9D  $M_J=2$, $M_\infty=0.3$, $T_J/T_\infty=3$
AREA FOR MOCK WAVE SUPPRESSION

METHOD OF ELIMINATING MACH WAVES FROM SUPERSONIC JETS

This application is a divisional of U.S. patent application Ser. No. 08/435,345, filed May 5, 1995 U.S. Pat. No. 5,590,520.

FIELD OF THE INVENTION

The present invention relates generally to aircraft jet engines that produce supersonic primary exhaust. More specifically, the invention relates to a system and a method for reducing or eliminating the generation of Mach waves from the exhaust without any significant loss in thrust or engine performance.

BACKGROUND OF THE INVENTION

Specific thrust in a jet engine is represented by pounds of thrust per pound of airflow. It is advantageous to have a high specific thrust for jet engines which propel aircraft at supersonic velocities, so as to provide for relatively small engine size. In order to achieve such high specific thrust, high airflows or high exhaust velocities are often used. However, jet noise is directly proportional to the exponential values of exhaust velocities, and for a high speed civil transport aircraft operable at flight velocities of greater than about Mach 2, jet noise is proportional to the fourth order of exhaust velocity. One of the major sources of noise from the supersonic exhaust is Mach waves which are generated when the air flow exceeds supersonic speeds. The high air velocities from the exhaust result in the generation of supersonic turbulent eddies which create pressure waves or noise.

Government regulations often limit the acceptable amount of noise which may be generated by an aircraft engine during the takeoff, initial climb and landing of the aircraft. Thus, in the development of supersonic aircraft, it has become increasingly important to find a means of controlling jet engine noise including Mach waves.

The main devices currently considered for suppression of Mach waves are lobe mixers and ejector shrouds. Lobe mixers accelerate the mixing between the jet gas and surrounding air causing the jet exhaust to decelerate faster as it exits the nozzle, thereby reducing the supersonic speed of the jet exhaust. Although this mixing does achieve a reduction in noise level, the mixing also results in significant thrust losses.

Ejector shrouds are a commonly considered alternative to lobe mixers for reducing engine noise. Ejector shrouds surround the jet core and act as mufflers. While such shrouds are effective at low flight speeds, the shrouds adversely affect aircraft performance at high speeds. Thus shrouds are generally designed to be retractable and storable at high speeds. However retractable or storable shrouds require complex mechanisms. Such complex mechanisms cause severe weight and space penalties.

Thus, there remains a need for a relatively simple mechanism which reduces supersonic jet engine noise without the severe thrust losses or severe weight and space penalties experienced by the prior art.

SUMMARY OF THE INVENTION

The invention described relates to the suppression of Mach waves in an aircraft engine. One aspect of the invention involves a method of avoiding the generation of Mach waves from an operating jet engine. The method includes the steps of:

(a) intaking air into a first end of a jet engine;

(b) heating a first stream of the air to a first temperature, accelerating the first stream of air to supersonic speeds and expelling this first stream out a second end of said jet engine;

(c) heating a second stream of said air to a calculated second temperature;

(d) maintaining the velocity of, accelerating or decelerating the second stream of air to a predetermined air velocity;

(e) expelling the second stream out the second end of the jet engine at a position adjacent to the first stream of air such that there is no gap between the first stream and the second stream; and (f) assuring that a speed and temperature of the second stream satisfy the following conditions:

the difference in air velocities between the first stream of air and the second stream is less than the speed of sound in the second stream; and difference in air velocity between the second stream and air flow surrounding the second stream is less than the speed of sound in the air flow;

the temperature of the second stream is greater than: $(B^*M_1/(1+M_2))^2 {}^*T_1$;

and the temperature of the second stream is less than: $T_a{}^*((1+M_a)/(B^*M_2))^2$;

where $M_1$=air velocity of the first stream divided by a first speed of sound in the first stream;

$M_2$=air velocity of the second stream divided by a second speed of sound in the second stream;

$M_a$=air velocity of ambient, unheated air surrounding the second stream, divided by ambient speed of sound;

$T_1$=temperature of air in the first stream;

$T_a$=temperature of ambient, unheated air surrounding the second stream; and

B=eddy velocity/stream velocity; wherein B can range between 0.5 and 0.95.

The heating described in step (c) can be achieved by several methods including the burning of fuel, mixing the first stream with the second stream, and changing the compression ratio of a fan. At a cross-sectional plane of the second end of the jet engine, the second stream can be formed to completely surround the first stream or it can be formed to partially surround the first stream. Step (d) can also be achieved by several methods, including changing a fan speed, changing the relative size of a second stream exhaust relative to a second stream intake and changing the mixing rate of the second stream with the first stream. Alternate variations on the method include adding and heating a third stream adjacent to the second stream. A gas other than air can also be used for the second stream.

Another aspect of the invention involves a method of avoiding the generation of Mach waves from a jet engine operating in ambient air. The method includes the steps of:

(a) intaking air into one end of a jet engine;

(b) heating a first stream of air to a first temperature and accelerating the first stream of air to a first air velocity exceeding the speed of sound in the ambient air and expelling the first stream out a second end of the jet engine;

(c) heating a second stream of air to a calculated second temperature and maintaining, accelerating or decelerating the second stream to a calculated second air velocity, wherein the second air velocity is less than or equal to that of the first air velocity;

(d) heating a third stream of air to a calculated third temperature and maintaining, accelerating or decelerating the third stream to a calculated third velocity, wherein the third air velocity is less than or equal to that of the second air velocity.

(e) expelling the second stream out the second end of the jet engine in a first position adjacent to the first stream of air; and (f) expelling the third stream of air out the second end of the jet engine in a second position adjacent to the first position In this aspect of the invention, the second temperature preferably satisfies the following conditions:

the temperature of the second stream is greater than:
$(B_1*M_1/(1+M_2))^2*T_1$;

and the temperature of the second stream is less than:
$T_a*((1+M_3)/(B_2*M_2))^2*((1+M_a)/(B_3*M_3))^2$;
where $M_3$=air velocity of the third stream divided by a third speed of sound in the third stream;

$M_2$=air velocity of the second stream divided by a second speed of sound is the second stream;

$M_1$=air velocity of the first stream divided by a first speed of sound in the first stream;

$M_a$=air velocity of ambient, unheated air surrounding the second stream;

$T_3$=temperature of air in the third stream;

$T_2$=temperature of air in the second stream;

$T_1$=temperature of air in the first stream;

$T_a$=temperature of ambient, unheated air surrounding the third stream;

$B_3$=ratio of eddy velocity to stream velocity in the third stream, ranging in value from 0.5 to 0.9;

$B_2$=ratio of eddy velocity to stream velocity in the second stream, ranging in value from 0.7 to 0.9; and $B_1$=ratio of eddy velocity to stream velocity in the first stream, ranging in value from 0.7 to 0.9.

In this aspect of the invention, the third temperature preferably satisfies the following conditions:

the temperature of the third stream is greater than:
$(B_2*M_2/(1+M_3))^2*(B_1*M_1/(1+M_2))^2*T_1$;

and the temperature of the second stream is less than:
$T_a*((1+M_a)/(B_3*M_3))^2$.

In addition, one or more additional streams can be heated adjacent to the third stream. If one or more additional streams are heated adjacent to the third stream, there can be four or more streams. The third stream can be at least partially heated using suppression burners. The heating of the third stream can also be at least partially accomplished by mixing the third stream with the first stream of air or the second stream of air.

Another aspect of this invention involves a jet engine which produces a supersonic stream of air. The jet engine described can be a turbojet engine, a turbofan engine, or some other type of engine. The engine includes an air intake end and an exhaust end. The exhaust end has a partition that divides the exhaust end into a first side and a second side such that a first stream exits the exhaust end on the first side and a second stream of heated air exits the exhaust end on the second side. The engine has a combustion chamber for heating which is adapted to heat the first stream such that the first stream is expelled from the exhaust end of the jet engine to produce a first thrust. The engine also has a heating mechanism adapted to heat the second stream to a temperature different from that of the first stream such that the second stream is also expelled from the exhaust end of the jet engine to produce a second thrust adjacent to the first thrust and thereby prevent Mach waves from the first thrust. The heating mechanism described in the jet engine can include a suppression burner (the suppression burner being designed to heat the air by burning a fuel), a variable compression ratio fan which can change its compression ratio and produce heat, or a divider which diverts the first stream to entirely form or to mix with the second stream. In the jet engine described, the first and second stream can pass through the combustion chamber before the partition separates the first stream from the second stream; after the separation, the heating mechanism is designed to further heat the second stream. The partition described can be the inner shell core of a jet engine. The partition can also have louvers or apertures which can be opened to allow mixing of the first and the second stream. The jet engine described can be at least partially surrounded by a shroud, the shroud forming a confining wall for the second stream. The jet engine described can also have a second divider which further divides the second stream from a third stream; and a heating mechanism adapted to heat the third stream to a temperature different from that of the second stream, such that the third stream is also expelled from the exhaust end of the jet engine to produce a third thrust adjacent to the second thrust and thereby prevent Mach waves from the second thrust.

In one embodiment, the jet engine emits the first stream with a circular or elliptical cross section at a plane, the plane located at the exhaust end of the jet engine. The jet engine described can also create the first stream with a rectangular cross section at a plane located at the exhaust end of the jet engine.

BRIEF DESCRIPTION OF THE DRAWINGS

FIG. 4. is a longitudinal sectional view of a turbo-fan engine which uses dividers to create a second stream and suppression burners to heat a third stream FIG. 5 is a longitudinal sectional view of the invention applied to a jet engine that does not usually have a bypass airstream.

FIG. 6 is a longitudinal sectional view of the invention used in a jet engine that does not usually have a bypass stream. This figure demonstrates the use of dividers to create the second stream from the original first stream.

FIGS. 9A through 9D are plots of acceptable second stream temperature ranges as a function of second stream air velocities.

DETAILED DESCRIPTION OF THE INVENTION

Introduction

Figure 1:
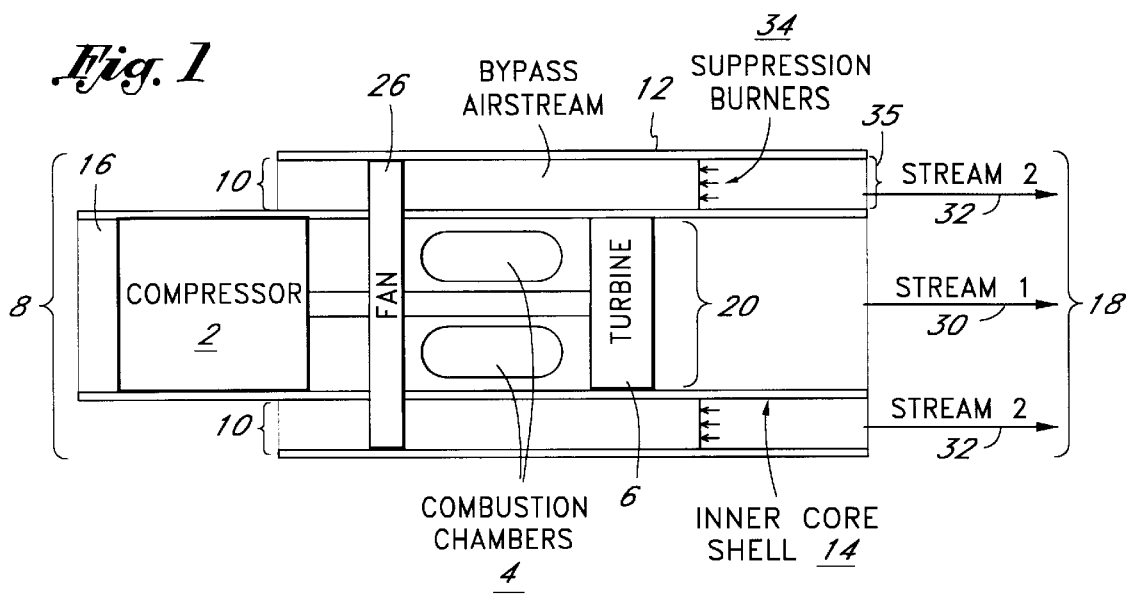
FIG. 1. is a longitudinal sectional view of a preferred embodiment of the present invention as applied to a turbo-fan engine.

The present invention relates to a supersonic jet engine installation designed to avoid generating Mach waves. The invention accomplishes this by surrounding the supersonic primary column of exhaust with a heated slower moving air flow or second stream in contact with the primary column. Complete elimination of Mach waves can be achieved by choosing a exhaust nozzle geometry that completely surrounds the primary column with the second stream. Alternately, elimination of Mach waves in certain selected directions, for example towards the ground, can be achieved by choosing an exhaust geometry that releases the second stream adjacent to the primary stream only in the regions in which suppression of Mach waves is necessary.

The temperature and velocity of the second stream of air is adjusted such that the difference in velocity between the second stream and any adjacent air flow is less than the speed of sound in the slower moving air flow. The range of acceptable temperatures and velocities are determined by a series of equations which are defined in the specifications. If the primary column of air is traveling at very high speeds, it may be impossible to satisfy the equations using only one second stream. In such cases, multiple layered air flows may be used, each air flow satisfying the condition that the difference in velocity between adjacent air flows is less than the speed of sound in the slower moving air flow.

A traditional turbofan engine already has a bypass stream around the primary column of air. In the preferred embodiment, this bypass stream is heated to act as the second stream. If additional air flows are needed, or if there is no bypass stream, the necessary air flows or second stream can be created by using shrouds and dividers to create additional channels for guiding the air flows.

Each of these streams or air flows must also be heated. There are many methods of heating these air flows. These methods include changing the compression ratio of the fan in the turbofan, burning fuel in the bypass stream, and mixing air from the primary column with the second stream. By controlling the temperature and velocity of streams adjacent to and surrounding the primary exhaust, the generation of Mach waves can be effectively eliminated or substantially reduced.

Principle of Invention

Mach waves are generated because turbulent eddies in the jet move with a convection velocity $U_c$ which is supersonic with respect to the surrounding air stream. Several theoretical and experimental studies have determined that the velocity of the eddies is generally approximately 85% of the jet velocity. However, this percentage can vary between about 50% and about 95%, depending on conditions and engine design.

The principle of the invention is to surround the jet exhaust with a layer of co-flowing gas such that (a) the jet eddies are subsonic with respect to the co-flow and (b) the co-flow eddies are subsonic with respect to the ambient air stream. Since all eddy motions are subsonic, no Mach waves are generated.

This principle can be expressed mathematically. In the following equations, the subscript 1 represents the primary supersonic exhaust properties or the first stream, subscript 2 represents the co-flow or second stream, and subscript 3 the ambient air stream surrounding the aircraft. U represents the air-flow velocity, "a" the speed of sound, and $U_c$ the convection velocity of the eddies (experimentally found to be approximately 85% of the jet velocity). The condition for the prevention of Mach waves can then be achieved if:

$$U_{c1}-U_2<a_2 \tag{1}$$

$$\text{and } U_{c2}-U_3<a_3 \tag{2}$$

It should be clear that although this expression is written for a single co-flow layer system. Multiple co-flow layers can be added as needed to suppress Mach waves from jets that exceed Mach 2. A general expression for the conditions that must be satisfied by the nth co-flow layer or the nth stream is that:

$$U_{c(n-1)}-U_n<a_n \tag{3}$$

Temperature and Velocity Requirements of Second Stream

In the following section, the full temperature and velocity requirements for a second stream will be derived; however as expressed in equation (3), a similar derivation can be done for any number of streams by one skilled in the art. Thus, the following derivation should not be interpreted as limiting the invention to only a single co-flow stream.

Figure 7A:
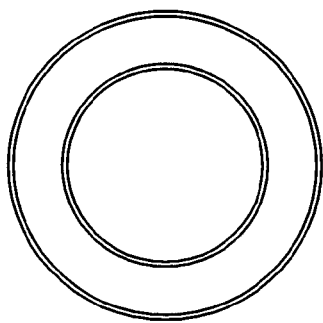
FIGS. 7A and 7B show an end view of a circular and a rectangular exhaust end, respectively, of a jet engine utilizing a complete Mach wave suppression geometry.
Figure 7B:
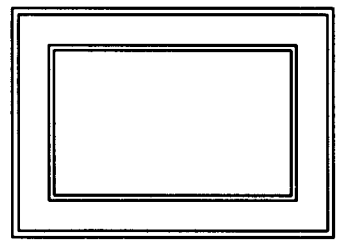
Figure 8A:
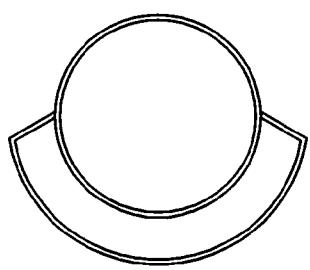
FIGS. 8A through 8D show an end view of the exhaust end of a jet engine utilizing various geometries designed for suppression of Mach waves only in pre-specified directions.
Figure 8B:
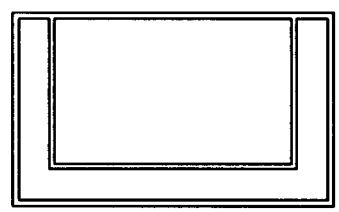
Figure 8C:
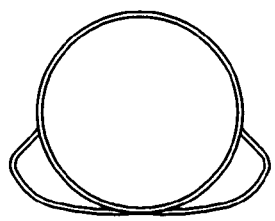
Figure 8D:
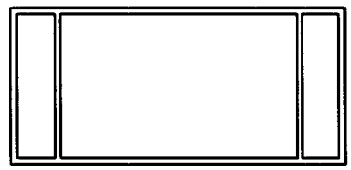

To eliminate Mach waves around the entire perimeter of the jet, the basic configuration of FIG. 7 should be applied, assuming that the exhaust nozzle is circular. It is crucial that the co-flow, second stream, be in direct contact with the edge of the first stream, i.e., there should be no gap between the first stream and the second stream. In addition, one must establish the range of second stream temperatures and velocities that will prevent Mach-wave generation. The general requirements for the second stream were established in Equations 1 and 2.

In the following equations, equations 1 and 2 will be converted to two equations that specify the temperature and velocity requirements for a single co-flow system. It will be assumed that the convective velocity of the eddies is a constant times the flow velocity, i.e., $Uc=BU$, with $B=0.85$. The analysis written below uses the following nomenclature.

Symbols:

a=speed of sound=$\sqrt{\gamma RT}$
M=Mach number=U/a
R=Gas constant (fixed)
T=Temperature
U=Velocity
Uc=Convective velocity
B=Uc/U=(a range from 0.5 to 0.95, usually around 0.85)
γ=specific heat ratio (constant)

Subscripts:

1: first stream or primary jet
2: second stream or co-flow
3: third stream or ambient air stream The first requirement is that the jet eddies are subsonic with respect to the co-flow (Equation 1):

$$U_{c1}-U_2<a_2 \tag{1}$$

which becomes $$BM_1a_1-M_2a_2<a_2 \tag{4}$$

Dividing by $a_3$ and rearranging, one obtains:

$$\frac{T_2}{T_3} > \left(\frac{BM}{1+M_2}\right)\frac{T_1}{T_3} \tag{5}$$

which establishes the lower bound for the coflow temperature.

The second requirement is that the co-flow eddies are subsonic with respect to the ambient air (Equation 2):

$$U_{c2} - U_3 < a_3 \qquad (2)$$

which becomes $$BM_2 a_2 - M_3 a_3 < a_3 \qquad (6)$$

Dividing by $a_3$ and rearranging, one obtains:

$$\frac{T_2}{T_3} < \left(\frac{1 + M_3}{BM_2}\right)^2 \qquad (7)$$

which establishes the upper bound for the co-flow temperature.

The combination of Equations 5 and 7 gives the following inequality for $T_2/T_3$:

$$\left(\frac{BM_1}{1+M_2}\right)^2 \frac{T_1}{T_3} < \frac{T_2}{T_3} < \left(\frac{1+M_3}{BM_2}\right)^2 \qquad (8)$$

which establishes the lower and upper bounds for $T_2$, as established by Equation 8, are plotted in FIG. 9 for $M_1=2$, $T_1/T_2=3$ (typical engine values), and $M_3$ ranging from 0 to 0.3 (typical take-off speeds). As long as $T_2$ stays within those bounds, Mach wave elimination is very likely. In practice, the points that require minimal additional heating are preferable to other points on the graph. Thus the optimum operating temperature and velocity of the co-flow will be around point O in FIG. 9.

The invention satisfies these equations by either changing the temperature and/or velocity of the traditional bypass stream and or by creating a totally new co-flow streams.

Laboratory Simulation of Co-flow use in Mach Wave Suppression

In order to prove that the proposed method and apparatus will eliminate or substantially reduce Mach wave generation, tests were conducted at the Supersonic Turbulence Laboratory at the University of California, Irvine. At the laboratory, a Mach 2 supersonic nozzle was surrounded by plastic casing that formed a nozzle for the co-flow stream. Instead of heating the co-flow, helium was used. Helium, as well as other low density gasses, accurately simulate the high temperatures that exist in an actual engine co-flow.

Figure 10A:
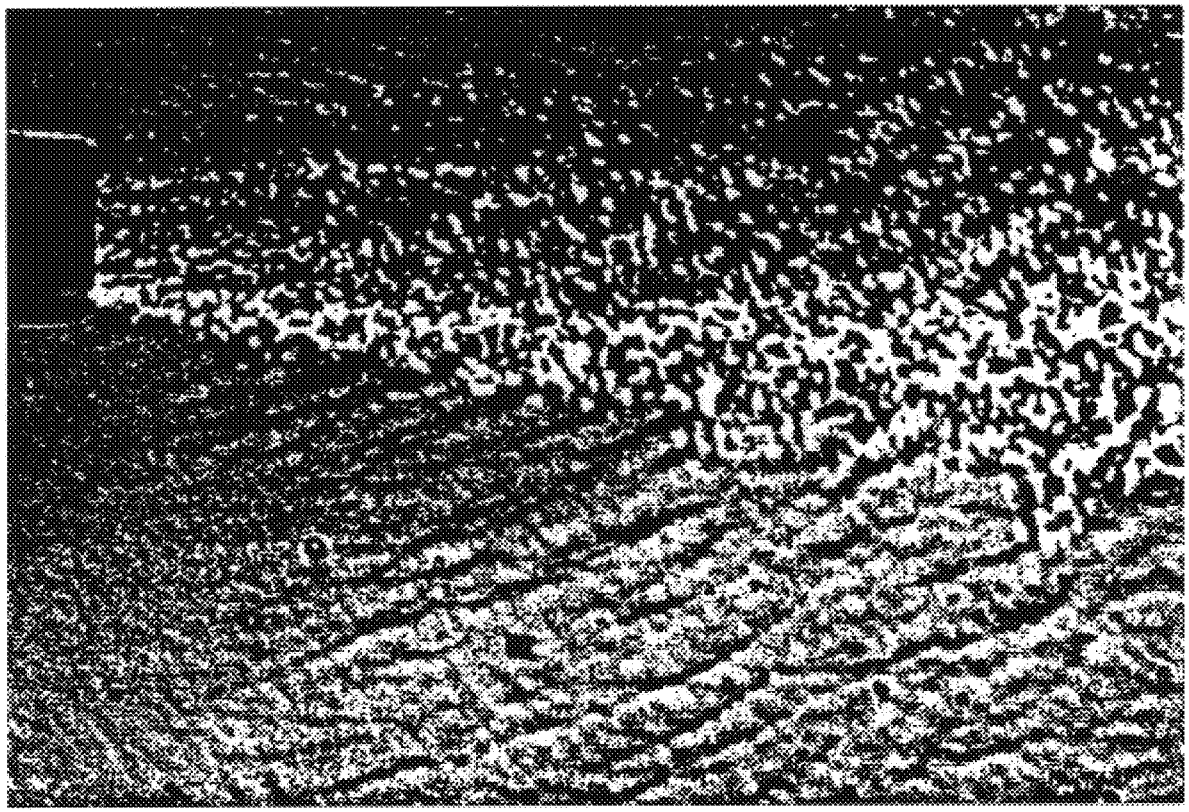
FIGS. 10A and 10B are photos of a laboratory simulation of the suppression of Mach waves using a helium co-flow to simulate a high temperature co-flow.
Figure 10B:
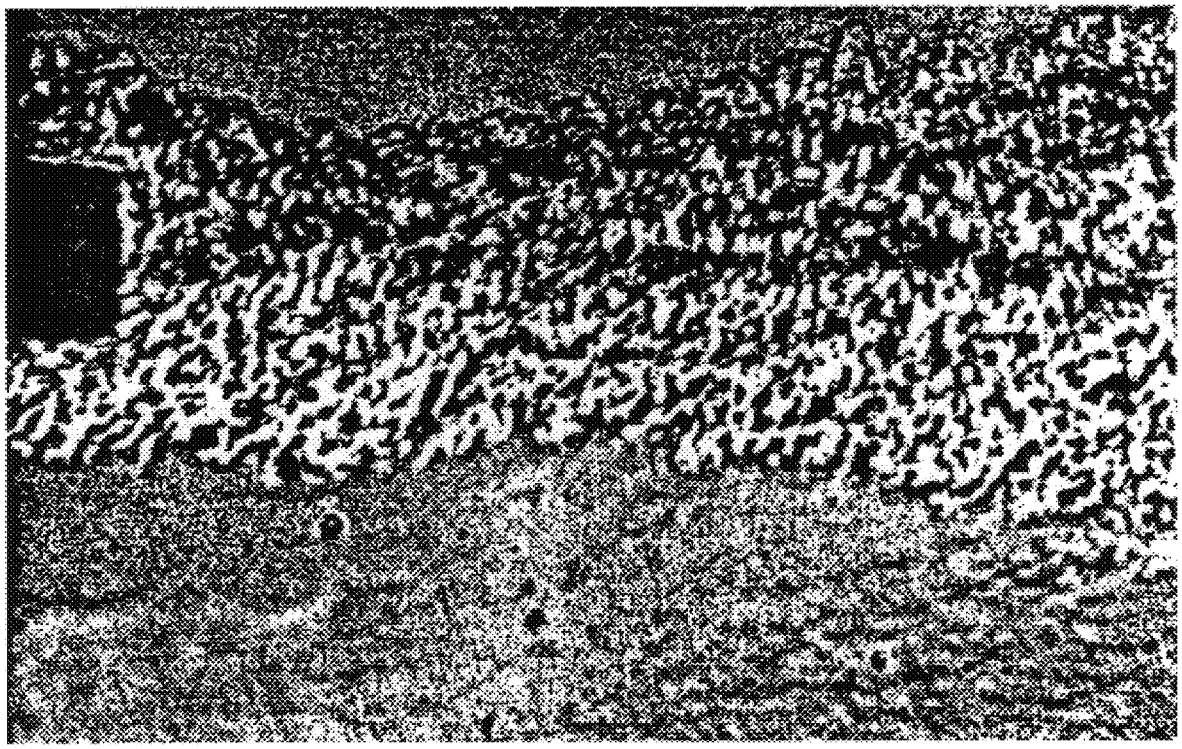

The test apparatus was placed on an optical table containing a schlieren optical system for flow visualization. FIG. 10(a) shows the system without the helium co-flow. Mach waves can be seen radiating out from the flow at about a 45 degree angle. When the helium co-flow is added, the Mach waves practically disappear, as shown in FIG. 10(b).

Basic Jet Engine

Each of FIGS. 1–6 schematically shows different embodiments of the present invention which satisfy the foregoing equations. Each of these figures includes the basic configuration of a jet engine. The basic engine includes a compressor 2, a combustion chamber 4, and a turbine 6. FIGS. 1–6 also provide schematic illustrations of different adaptations of the invention for use in various engine types.

A basic turbofan engine installation 10 is schematically shown in FIGS. 1–4 in connection with four different embodiments of the present invention. The engine comprises an outer shell housing 12, and an inner core shell 14. The outer shell has an opening called an engine intake 8 at one end and an engine exhaust 18 at the opposite end. Within the outer shell is an inner core shell which also has an inlet section 16 for air to flow in and an inner exhaust section 20.

The inner core shell also contains the standard components of a jet engine. These elements usually include a compressor 2, a combustion chamber 4, and a turbine 6. In turbofan jet engines, a fan 26 near the engine intake 8 helps force air through the engine.

In the traditional turbofan engine shown in FIG. 1, an opening or air intake 8 exists at the forward end of the jet engine. Air is pulled into the air intake either by means of a fan 26 or by the natural movement of air into the intake 8 by the forward motion of the aircraft. After the air enters the intake, it is divided into two or more parts. Part of the air that flows into the air intake passes into the inner core shell 14 through the inlet 16. In the inner core shell, a compressor 2 pressurizes the incoming air. The pressurized air is then subsequently heated in the combustion chamber 4, usually by burning jet fuel in the combustion chamber. This hot pressurized air rapidly exits the combustion chamber and turns a turbine 6. Part of the energy generated by the turning turbine is often used to drive the compressor 2. From the turbine, the air is expelled to the exhaust where it exits as a first stream 30 at high, often supersonic, speeds and provides the primary thrust to drive the aircraft forward.

Another part of the air drawn into the air intake 8 does not flow into the inner shell but instead flows into a second stream intake 10 between the inner core shell 12 and the outer shell 14. This stream of air forms a bypass stream or a second stream 32. This second stream also contributes to the thrust of a turbofan engine. In one embodiment, of the present invention the speed and temperature of this second stream are adjusted to fall within certain temperature and velocities to prevent the generation of Mach waves.

Embodiments of the Present Invention

In the preferred embodiment shown in FIG. 1, heating elements are used in the bypass stream to heat the second stream to a desired temperature. One convenient mode for heating the second stream is by using suppression burners 34 to burn fuel in the second stream. The amount of fuel burned by the suppression burners to reach a certain temperature can be determined by electronics. These electronics determine the amount of fuel burned based on the speed and temperature of the air exiting the combustion chamber. Alternate, embodiments include the placement of sensors in the various exhaust regions to determine the amount of fuel burning necessary to achieve the desired temperature. Sensors and control systems to monitor and control air flow and temperature for this purpose are well known to those skilled in the art.

Many traditional turbo-fan engines already produce a bypass stream between the inner core shell 14 and the outer shell housing 12. Thus, it is convenient to implement the present invention in such jet engines by modifying the bypass stream to serve as a co-flow or second stream that satisfies the above conditions.

The velocity of the second stream (the new co-flow or the altered bypass stream) can be controlled by a variety of techniques, many of which will be recognized by those having ordinary skill in the art. For example, one or a combination of the following methods can be used to adjust velocity: (1) altering the aperture size of the second stream exhaust 35 relative to the second stream intake 36; (2) changing the fan 26 speed; and/or (3) changing the mixing rate from the first stream by altering the opening of the louvers 40. As shown in the equations, the velocity and temperature are interrelated. Thus, it is important to control both the velocity and temperature of the second stream. However, in a preferred embodiment, the velocity of the second stream will be set for optimum engine performance, and the equations satisfied through the use of temperature adjustments to the second stream.

The change of temperature in the second stream (the new co-flow or the altered bypass stream) may be controlled by using one or a combination of the following methods: (1) altering the design of the inner core shell to divert hot air from the first stream and mixing it appropriately with the second stream (2) adding a heating mechanism 34 to independently heat a second stream and/or (3) increasing the compression ratio of the fan 26 if the second stream is derived from the bypass stream of a turbofan. Additional streams may also be added if additional layers are needed to satisfy the general conditions expressed in equation (3).

Figure 2:
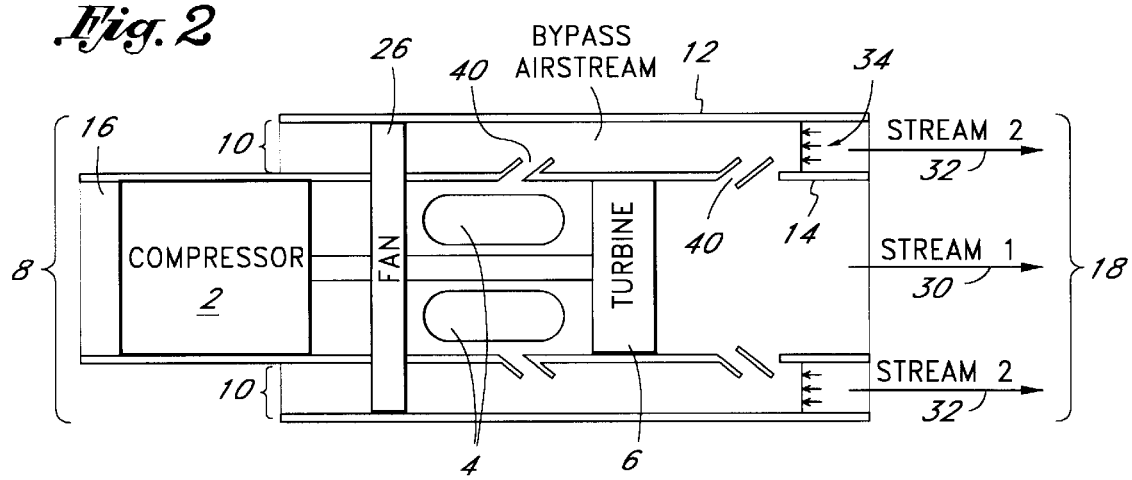
FIG. 2. is a longitudinal sectional view of the turbo-fan engine of FIG. 1 with the addition of dividers or louvers in the core shell to assist the suppression burners.

Another method for heating the air in the bypass stream involves placing louvers, or dividers, 40 on the inner core shell. FIG. 2. These louvers or apertures, sometimes adjustable, can be opened to divert air from the combustion chamber and the first stream to enter the bypass stream or second stream thereby requiring that less fuel be burned by the suppression burners 34, or possibly eliminating the need for suppression burners altogether. The temperature of the second stream may be controlled by controlling the amount of mixing which occurs.

Another possibility for heating the air in the second stream is by increasing the compression ratio of the fan 26 if the second stream is also the bypass stream in a traditional turbo-fan engine.

If the first stream exiting a jet engine exceeds the speed of sound by a significant margin, it may become impossible to meet the conditions set forth in equations 1 and 2. Clearly, if the speed of the first stream significantly exceeds Mach two, it will be impossible to keep the difference in speeds between the first stream, the second stream, and the ambient air less than the speed of sound in the respective streams. In such cases, the bypass stream or the second stream can be divided to create an additional co-flow stream. Each stream must then meet the boundary condition that the difference between the stream speed at the interface of each stream and the adjacent airflows is less than the speed of sound in the slower moving stream at each interface. This condition was mathematically expressed in equation (3).

Figure 3:
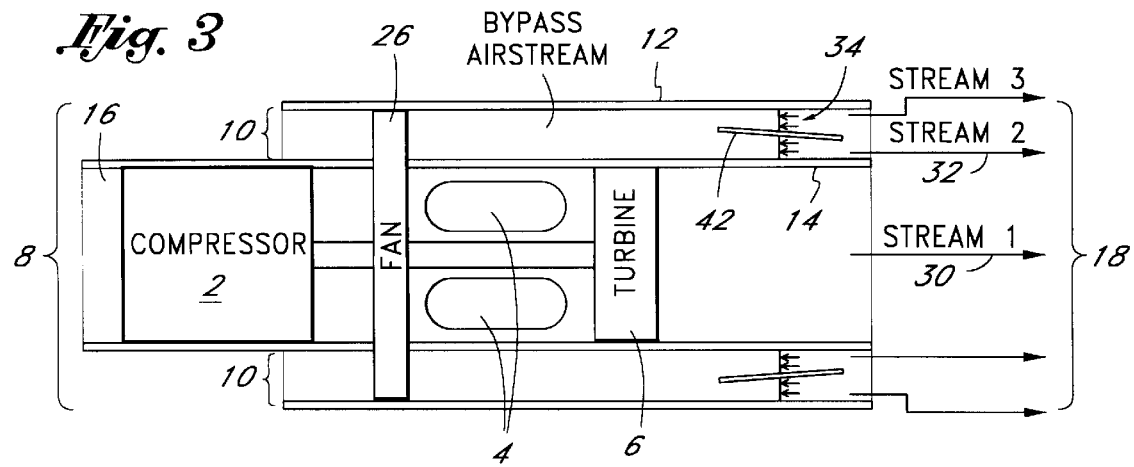
FIG. 3. is a longitudinal sectional view of an alternate embodiment of the preferred embodiment shown in FIG. 1 with splitter shrouds added to form two co-flow streams for Mach wave suppression.

One method of generating two co-flows from the bypass airstream is shown in FIG. 3. A splitter shroud 42 is placed in the path of the bypass stream. The splitter shroud separates the region between the inner core shell and the outer shell into two distinct regions. Heating mechanisms, possibly suppression burners, are placed on either side of the shroud and independently heat the two regions to temperatures determined by the conditions specified in equation (3).

A dual co-flow system can also use the method of taking heat from the primary stream to assist the heating mechanism or suppression burners. A possible implementation of such a three layer system is shown in FIG. 4. Dividers 36 divert hot air from stream one into either stream two or stream three. Suppression burners may be used to further raise the temperature in one or both of the streams.

In the embodiments described, and in most turbo-fan engines, a fan 26 at the front end of the engine helps pull air into the engine. In most such engines, a natural bypass stream is created between the inner shell core and the outer shell. This bypass stream has been manipulated to also control the formation of Mach waves. However, the use of this invention does not depend on the existence of a traditional bypass stream.

Certain jets, such as turbojets and ramjets, do not utilize an outer shell, thus a bypass stream does not usually exist. Nevertheless, a second stream can be created for the suppression of Mach waves by the use of a shroud 50 around the inner core shell as shown in FIG. 5. Suppression burners 32 can be placed between the shroud and the inner core shell 14. The suppression burners heat the second stream of air which passes between the shroud and the inner core shell.

In engines without an outer shell, dividers 36 can also be used to separate the single stream exiting the combustion chamber into two or more streams. Such a configuration is shown in FIG. 6. The first stream 30 exits the exhaust without further changes in temperature. A second stream 32 is created from the products of the combustion chamber and exits the exhaust section of the engine adjacent to the first stream. Suppression burners 34 placed in the path of the second stream can be used to further heat the second stream.

A second element of the invention involves adjusting the exhaust nozzle geometry to position the first, second, and potential third stream in such a way as to eliminate Mach waves. The second stream must exit the exhaust of the jet engine in a position adjacent to the first stream such that there are no gaps between the first and second stream. If an additional co-flow stream is used, this third stream must exit the exhaust in a position adjacent to the second stream such that there are no gaps between the second stream and the third stream.

To completely eliminate the formation of Mach waves, the slower stream should totally surround the perimeter of the faster moving air stream. This condition may be accomplished by designing exhaust geometries such that the exit opening for the second stream completely surrounds the perimeter of the exit opening for the first stream. A cross sectional view of such an embodiment for a circular exhaust shape is shown in FIG. 7($a$). Other shapes are also possible, a rectangular cross section can also be implemented, as shown in FIG. 7($b$).

In practice, it is not always necessary to completely eliminate the formation of Mach waves. Often, it is only necessary to eliminate Mach waves that disturb people, i.e. generally only those Mach waves that are directed downwards toward the earth. Thus, an exhaust nozzle geometry which achieves elimination of only the Mach waves directed at earth can be accomplished by designing the second stream to exit around only the bottom half perimeter of the first stream. Examples of such an arrangement are shown for a circular cross section FIG. 8($a$) and for a rectangular cross section FIG. 8($b$).

If more Mach wave noise can be tolerated, further reductions in the amount of second stream generation may be acceptable making other exit nozzle geometries appropriate. For example, if it is unnecessary to eliminate Mach wave noise in the area directly beneath the take off and landing runways, an alternate design might only eliminate Mach waves that travel towards the side of the original stream. Examples of such an arrangement are shown for a circular exhaust cross section FIG. 8($c$) and for a rectangular cross section FIG. 8($d$).

The invention and its advantages will be understood from the foregoing description and it will be apparent that various changes may be made in the form, construction, and arrangements of the parts of the invention without departing form the spirit and scope thereof or sacrificing its material advantages. The arrangements described are merely by way of example. We do not wish to be restricted to the specific forms shown or uses mentioned except as defined in the following claims.

I claim:

1. A jet engine which produces a supersonic stream of air, said engine comprising:

a structure adapted to provide a compression ratio sufficient to produce a supersonic thrust;

an air intake end and an exhaust end;

said exhaust end having a partition that divides said exhaust end into a first side and a second side such that a first stream exits said exhaust end on said first side and a second stream of heated air exits said exhaust end on said second side;

a combustion chamber for heating adapted to heat said first stream such that said first stream is expelled from said exhaust end of said engine to produce said supersonic thrust, and a heating mechanism adapted to heat said second stream such that said second stream is expelled from said exhaust end of said jet engine to produce a subsonic thrust adjacent to said first thrust and thereby prevent Mach waves from said supersonic thrust.

2. The jet engine of claim 1, wherein said first and second stream pass through said combustion chamber before said partition separates said first stream from said second stream; after said separation, said heating mechanism designed to further heat said second stream.

3. The jet engine of claim 1 wherein said jet engine is a turbojet engine.

4. The jet engine of claim 1 wherein said jet engine is a turbofan engine.

5. The jet engine of claim 1, wherein said heating mechanism is a suppression burner, said suppression burner being designed to heat the air by burning a fuel.

6. The jet engine of claim 1, wherein said heating mechanism is a variable compression ratio fan which can change its compression ratio and produce heat.

7. The jet engine of claim 1, wherein said partition is an inner shell core of a jet engine.

8. The jet engine of claim 1, wherein said partition further has louvers or apertures which can be opened to allow mixing of said first and said second stream.

9. The jet engine of claim 1, wherein said jet engine is at least partially surrounded by a shroud, said shroud forming a confining wall for said second stream.

10. The jet engine of claim 1, wherein said heating mechanism is a divider which diverts said first stream to entirely form or to mix with said second stream.

11. The jet engine of claim 10, wherein said jet engine has a second divider which further divides said second stream from a third stream; and a heating mechanism adapted to heat said third stream to a temperature different from that of said second stream, such that said third stream is also expelled from said exhaust end of said jet engine to produce a third thrust adjacent to said second thrust and thereby prevent Mach waves from said second thrust.

12. The jet engine of claim 1, wherein said first stream has a circular or elliptical cross section at a plane, said plane located at said exhaust end of said jet engine.

13. The jet engine of claim 1, wherein said first stream has a rectangular cross section at a plane located at said exhaust end of said jet engine.

14. A jet engine in use propelling an aircraft at a supersonic speed together with the exhaust stream thereof, said engine comprising:

an air intake end and an exhaust end;

a first passage and a second passage extending between said air intake end and said exhaust end;

a combustion chamber in fluid communication with and located along said first passage such that a portion of said first passage is disposed to receive a first flow of exhaust between said combustion chamber and said exhaust end;

said first flow of exhaust forming said supersonic exhaust stream upon exiting said engine;

a heating mechanism in fluid communication with and located along said second passage such that a portion of said second passage is disposed to receive a second flow of exhaust between said heating mechanism and said exhaust end;

said second flow of exhaust forming a subsonic exhaust stream upon exiting said engine; and said supersonic exhaust stream at least partially enveloped by said subsonic exhaust stream.

15. The jet engine of claim 14 wherein said jet engine is a turbofan engine.

16. The jet engine of claim 14, wherein said heating mechanism is a suppression burner, said suppression burner being designed to heat the air by burning a fuel.

17. The jet engine of claim 14, wherein said second passage substantially encloses said first passage.

18. The jet engine of claim 14, wherein said jet engine is at least partially surrounded by a shroud, said shroud defining an exterior wall of said second passage.

19. The jet engine of claim 1, wherein said first exhaust stream has a circular or elliptical cross section at a plane, said plane located at said exhaust end of said engine.

* * * * *